United States Patent
Kawasaki

(10) Patent No.: US 9,626,131 B2
(45) Date of Patent: Apr. 18, 2017

(54) PRINT DATA PROCESSING METHOD, PRINT DATA PROCESSING APPARATUS, AND STORAGE MEDIUM FOR PROCESSING PRINT DATA ACCORDING TO PRINT SETTING INFORMATION IN THE PRINT DATA

(75) Inventor: Keiji Kawasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 13/559,362

(22) Filed: Jul. 26, 2012

(65) Prior Publication Data

US 2013/0050750 A1 Feb. 28, 2013

(30) Foreign Application Priority Data

Aug. 26, 2011 (JP) ................... 2011-185044

(51) Int. Cl.
*G06F 3/12* (2006.01)

(52) U.S. Cl.
CPC .......... *G06F 3/1206* (2013.01); *G06F 3/1245* (2013.01); *G06F 3/1246* (2013.01); *G06F 3/1275* (2013.01)

(58) Field of Classification Search
None
See application file for complete search history.

(56) References Cited

U.S. PATENT DOCUMENTS

| 2008/0151294 A1* | 6/2008 | Natori ................... G06F 17/211 358/1.15 |
| 2009/0290185 A1* | 11/2009 | Shiohara ...................... 358/1.13 |
| 2013/0014000 A1* | 1/2013 | Popov et al. ................. 715/234 |

FOREIGN PATENT DOCUMENTS

| JP | 11-143661 A | 5/1999 |
| JP | 2009-282843 A | 12/2009 |

\* cited by examiner

*Primary Examiner* — Marivelisse Santiago Cordero
*Assistant Examiner* — Neil R McLean
(74) *Attorney, Agent, or Firm* — Canon USA, Inc. I.P. Division

(57) ABSTRACT

A print data processing method includes inputting print data and storing the print data in a storage region with a first filter including an interface in a stream format as an input/output interface, sequentially inputting and analyzing parts constituting the print data with a second filter arranged after the first filter and including an interface in a document format as an input/output interface, processing the print data stored in the storage region according to print setting information acquired from the print data as a result of the analyzing by performing the analyzing, and ending processing without inputting all or a part of subsequent parts after the print setting information is acquired by the second filter.

16 Claims, 13 Drawing Sheets

PRINT DATA PROCESSING METHOD, PRINT DATA PROCESSING APPARATUS, AND STORAGE MEDIUM FOR PROCESSING PRINT DATA ACCORDING TO PRINT SETTING INFORMATION IN THE PRINT DATA

BACKGROUND OF THE INVENTION

Field of the Invention

The present invention relates to a print data processing method, print data processing apparatus, and storage medium.

Description of the Related Art

Japanese Patent Application Laid-Open No. 11-143661 conventionally discusses a technique in which a document generated by an application is acquired using a virtual printer driver (hereafter, referred to as a "virtual driver"). According to Japanese Patent Application Laid-Open No. 11-143661, first, an application instructs the virtual driver to perform printing to spool print data in a print queue of the virtual driver. Print setting information in the print data includes output control information describing content of the processing to be performed on the print data. The virtual driver processes the print data according to the content of the output control information. For example, the virtual driver performs processing such as distributed printing on a plurality of output apparatuses.

As describe above, the virtual driver receives a print instruction to receive documents of various kinds of applications as the print data, and then can perform processing. Further, the processing content on the virtual driver is described in print setting information to be added to the print data, and thus the processing content of the virtual driver can be changed according to a user's instruction and other conditions.

In order for the virtual driver to acquire the print setting information in the print data, a configuration of the print data needs to be interpreted and rasterized. However, rasterization processing unique to the print data is not technically easy for some configurations of the print data. Further, it may be hard to deal with the configuration changed with upgrading a version of the print data format.

SUMMARY OF THE INVENTION

The present invention is directed to processing print data with a simple and solid configuration according to print setting information in the print data.

According to an aspect of the present invention, a print data processing method includes inputting print data and storing the print data in a storage region with a first filter including an interface in a stream format as an input/output interface, sequentially inputting and analyzing parts constituting the print data with a second filter arranged after the first filter and including an interface in a document format as an input/output interface, processing the print data stored in the storage region according to print setting information acquired from the print data as a result of the analyzing by performing the analyzing, and ending processing without inputting all or a part of subsequent parts after the print setting information is acquired by the second filter.

Further features and aspects of the present invention will become apparent from the following detailed description of exemplary embodiments with reference to the attached drawings.

DESCRIPTION OF THE EMBODIMENTS

Various exemplary embodiments, features, and aspects of the invention will be described in detail below with reference to the drawings.

Figure 1:
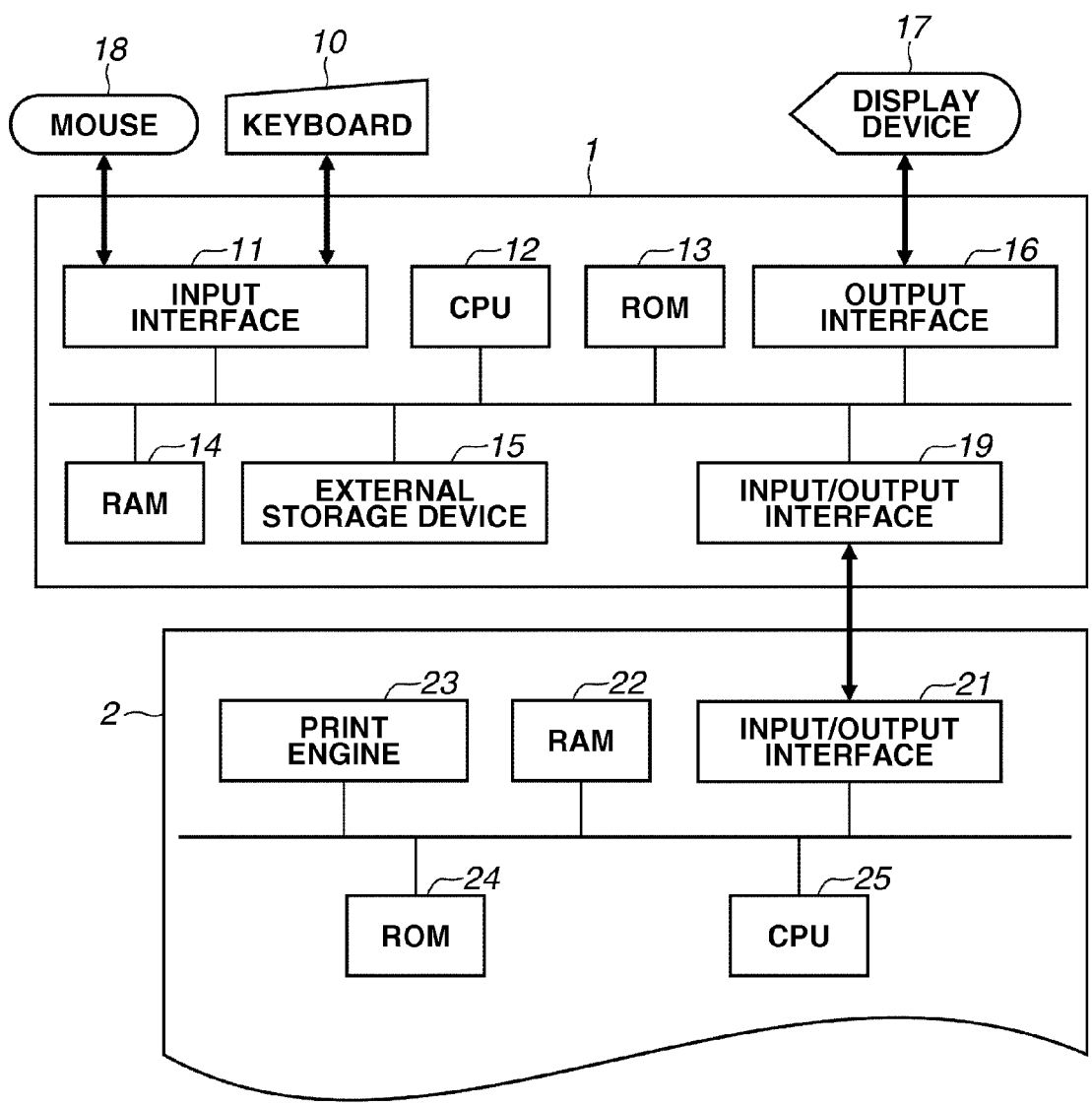
FIG. 1 is an example of a schematic view illustrating an entire configuration of a print system including a printing apparatus and an information processing apparatus connected thereto.

A first exemplary embodiment will be described below. FIG. 1 is an example schematically illustrating an entire configuration of a print system including a printing apparatus 2 and an information processing apparatus (personal computer (PC) 1) connected thereto. The PC 1 includes an input interface 11, a central processing unit (CPU) 12, a read only memory (ROM) 13, a random access memory (RAM) 14, an external storage device 15, an output interface 16, a display unit 17, a keyboard 10, a mouse 18, and an input/output interface 19. The ROM 13 includes an initialization program, and the external storage device 15 stores various kinds of data including groups of application programs, an operating system (OS), and a printer driver. The RAM 14 is used by various kinds of programs stored in the external storage device 15 as a work memory.

The CPU 12 executes processing based on the program, to realize a software configuration and processing of a flowchart described below. The printing apparatus 2 includes an input/output interface 21, an RAM 22, a print engine 23, an ROM 24, and a CPU 25. The input/output interface 21 is connected to the input/output interface 19 of the PC 1. The RAM 22 is used as a main memory and the work memory of the CPU 25 and stores various kinds of data and a reception buffer for once storing a received print job. The print engine 23 performs printing based on the data stored in the RAM 22. The ROM 24 stores data to be used by various kinds of control programs, and the CPU 25 controls each unit of the printing apparatus 2 according to the control programs.

As an example, processing is assigned to the PC 1 and the printing apparatus 2 as described above, however, the configuration of assigning the processing is not limited to the present example and may be differently configured. The PC 1 is an example of a print data processing apparatus (computer).

Figure 2:
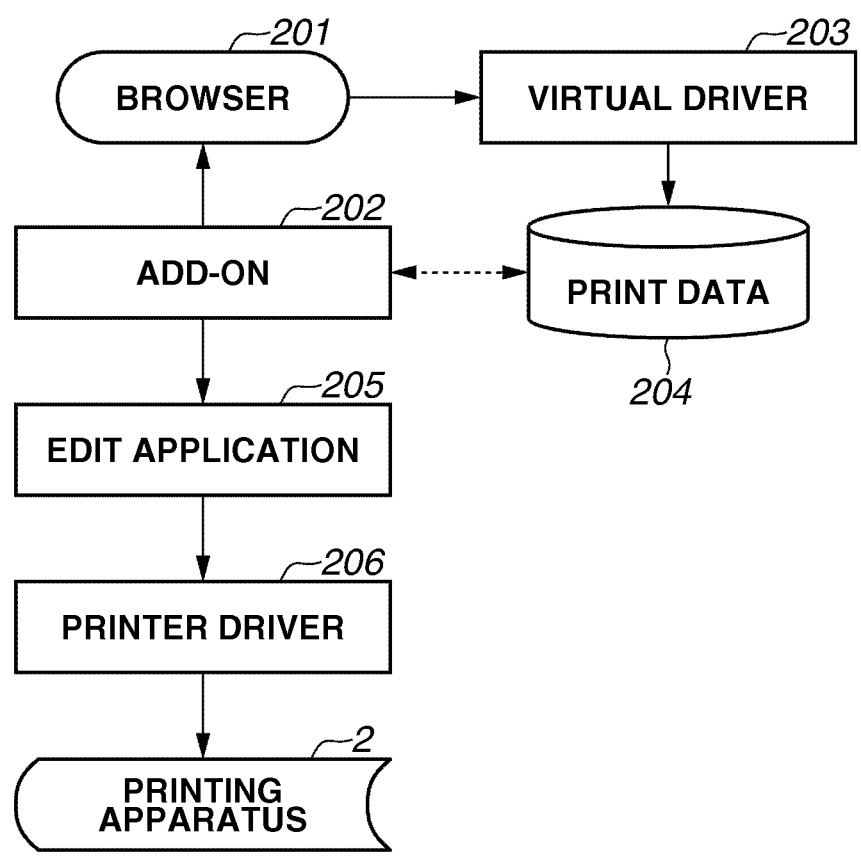
FIG. 2 is an example of a software configuration of the information processing apparatus.

FIG. 2 is an example illustrating a software configuration of the PC 1. A browser 201 is an application for displaying a web page. The browser 201 downloads a structured document received from a WWW server (not illustrated) via an internet (not illustrated) to the external storage device 15, and performs display on the display unit 17 based on the structured document. The web page is a structured document file such as a HyperText Markup Language (HTML) and an Extensible Hypertext Markup Language (XHTML), and elements of text and images are described with tags.

An add-on 202 is plug-in software called from a browser 201. The add-on 202 includes a user interface, which receives from a user an execution of processing such as printing, preview, and clipping of a part of a region of the web page. In response to a user's input, the add-on 202 gives an instruction to the browser 201 to print the web page currently displayed to a virtual driver 203. The virtual driver 203 is a virtual printer driver that is not connected to a specific printing apparatus but is configured to store spooled print data into the external storage device 15 and the RAM 14. The add-on 202 includes the print data storage location information in a predetermined location for the print setting information specified when printing is instructed. The add-on 202 may request the virtual driver 203 to add the print data storage location information to the print setting information, and the virtual driver 203 may include the storage location information. The print data storage location information herein refers to a full path including a file name, for example.

The print data generated by the browser 201 is stored in the external storage device 15 and the RAM 14 by the virtual driver 203. At this point, the virtual driver 203 stores print data 204 in a location according to the print data storage location information included in the print setting information. After the add-on 202 gives the virtual driver 203 the instruction for performing printing, the add-on 202 periodically checks with a spooler described below whether an issued print job remains. When the print job does not remain, the add-on 202 activates an edition application 205 to transmit to the edition application 205 the print data 204 and the instruction input from the user via the user interface of the add-on 202. The add-on 202 may periodically check whether the print data is stored in the storage location of the specified print data, to determine whether the print data storage has been completed.

According to the received instruction, the edition application 205 edits and displays the print data, and finally issues a print request to a printer driver 206. The printer driver 206 receives the print data edited by the edition application 205, and converts the print data into a print command that can be interpreted by the printing apparatus 2. The printer driver 206 transmits the print command to the printing apparatus 2. The printing apparatus 2 performs print processing based on the received print command.

As described above, the print program according to the present exemplary embodiment can appropriately edit and print the web page displayed on the browser 201. The virtual driver 203 herein is directed to acquiring intermediate data generated based on the web page. Since the intermediate data can be edited afterward, it is desirable that vector data be used that maintains a format in text or graphics not raster data rasterized with a specific resolution. The print data generated by printing from the browser 201 is normally the vector data, and thus, according to the print program of the present exemplary embodiment, the print data is used as the intermediate data. With such a configuration, even when the intermediate data generated based on the web page from the browser 201 cannot be directly acquired, the add-on 202 can retrieve the print data, which is the vector data, as the intermediate data.

Further, the print program according to the present exemplary embodiment, the add-on 202 specifies for the virtual driver 203 the storage location of the print data, so that communication is not generated between the virtual driver 203 and the add-on 202 or the edition application 205. The communication can be avoided between two programs operating under a specific condition that are the virtual driver 203, which is the printer driver, and the add-on 202, which is the plug-in software of the browser 201. Furthermore, the add-on 202 can perform various controls in an integrated manner, so that various kinds of requests from users can be easily handled.

Figure 3:
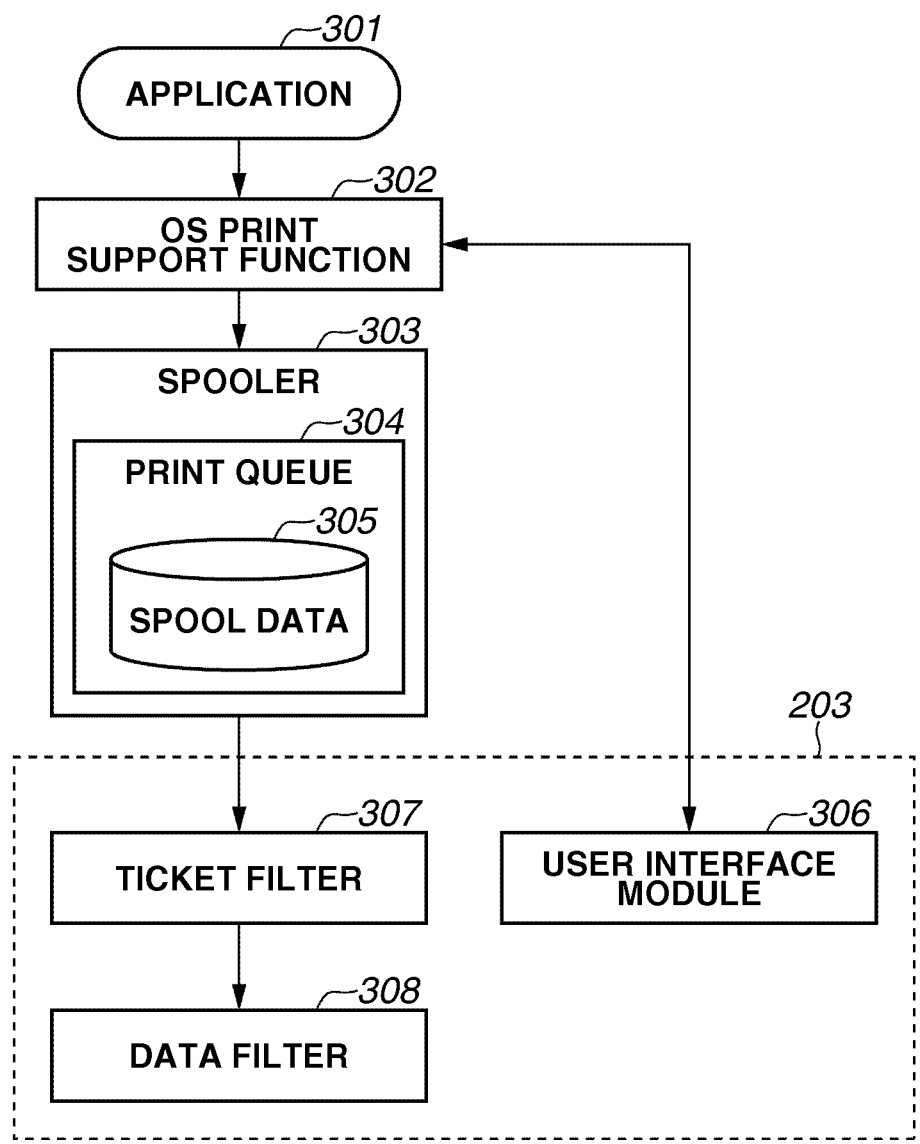
FIG. 3 is an example of a schematic view illustrating an overall configuration of a virtual driver in a print program according to a first exemplary embodiment.

FIG. 3 is an example of a schematic view illustrating an entire configuration of the virtual driver 203 in the print program according to a first exemplary embodiment. A print system will be described in which Windows (registered trademark) of Microsoft is used as the OS for the PC generally used. Further, the print system will be descried in which extensible markup language (XML) paper specification (hereafter, referred to as "XPS"), which is one of electronic document formats of open standards developed by Microsoft, is used as a spool data format. Hereafter, the printer driver operating on such a print system is referred to as an "XPS" driver.

The print data generated by an application 301 such as the browser 201 is temporarily stored in a print queue 304 of a spooler 303 as spool data 305 via a print support function 302 of the OS. Depending on the type of the print data generated by the application 301, the print data is directly stored in the spool data 305 without via the print support function 302 of the OS. The spool data 305 is managed by the spooler 303 as a print job to which a name is added. The print job is sequentially processed by the virtual driver 203. When giving a print instruction, the application 301 adds to the print job the print setting information returned from a user interface module 306. The print setting information is previously set before the print start instruction has been given from application 301.

The print data transmitted to the virtual driver 203 is firstly processed by a ticket filter 307. The filter herein is a program having a function of outputting certain data via an operation of process, conversion, non-conversion, and generation based on the input data, and called from a filter management function of the OS described below. It is permissible for the XPS driver to configure an arbitrary number of filters in an arbitrary number of orders, according to a purpose and a function thereof. With reference to PrintTicket (PT: print setting information in the XPS document) in the print data, information including the location for storing the print data is acquired. A data filter 308 stores the input print data in the above-described location for storing the print data.

The final filter generally converts the input print data into the print command that can be interpreted by the printing apparatus 2 to output it. The output print command reaches the printing apparatus 2 via a port driver corresponding to a port associated with the printer driver. An output port of the virtual driver 203 according to the present exemplary embodiment is defined as a null (NUL) port. The NUL port is a logical port only for ignoring all input data. A function of the virtual driver 203 is to store the print data into the external storage device 15, which is performed by the data filter 308. Accordingly, the data filter 308 does not output any data. Therefore, the output port of the virtual driver 203 may not be the NUL port and may be any port. Further, the data filter 308 may output the print data and the print data storage location information, and the port driver may store the print data. According to an example illustrated in FIG. 3, the data filter 308 is disposed after the ticket filter 307.

As described above, the XPS driver is allowed to constitute the arbitrary number of the filters in the arbitrary order. The interface receiving/transmitting the data between the filters has two types of formats, which are an XPS stream format and an XPS document format.

The interface in the XPS stream format deals with the print data as a bite stream. The interface in the XPS document format deals with the XPS document, which is the print data, in XPS part unit. The XPS part referred to herein indicates a resource including fixed document sequence (FDS), fixed document (FD), and fixed page (FP), and further print ticket (PT), the image, and the font accompanying them. Each filter is previously configured to use either of the interfaces for each of input and output. The filter using the interface in the XPS document format for the input does not need to analyze the XPS document to extract the XPS part. Therefore, compared with the filter in the XPS stream format, layout processing requiring a change of the FP can be performed easily.

Figure 4:
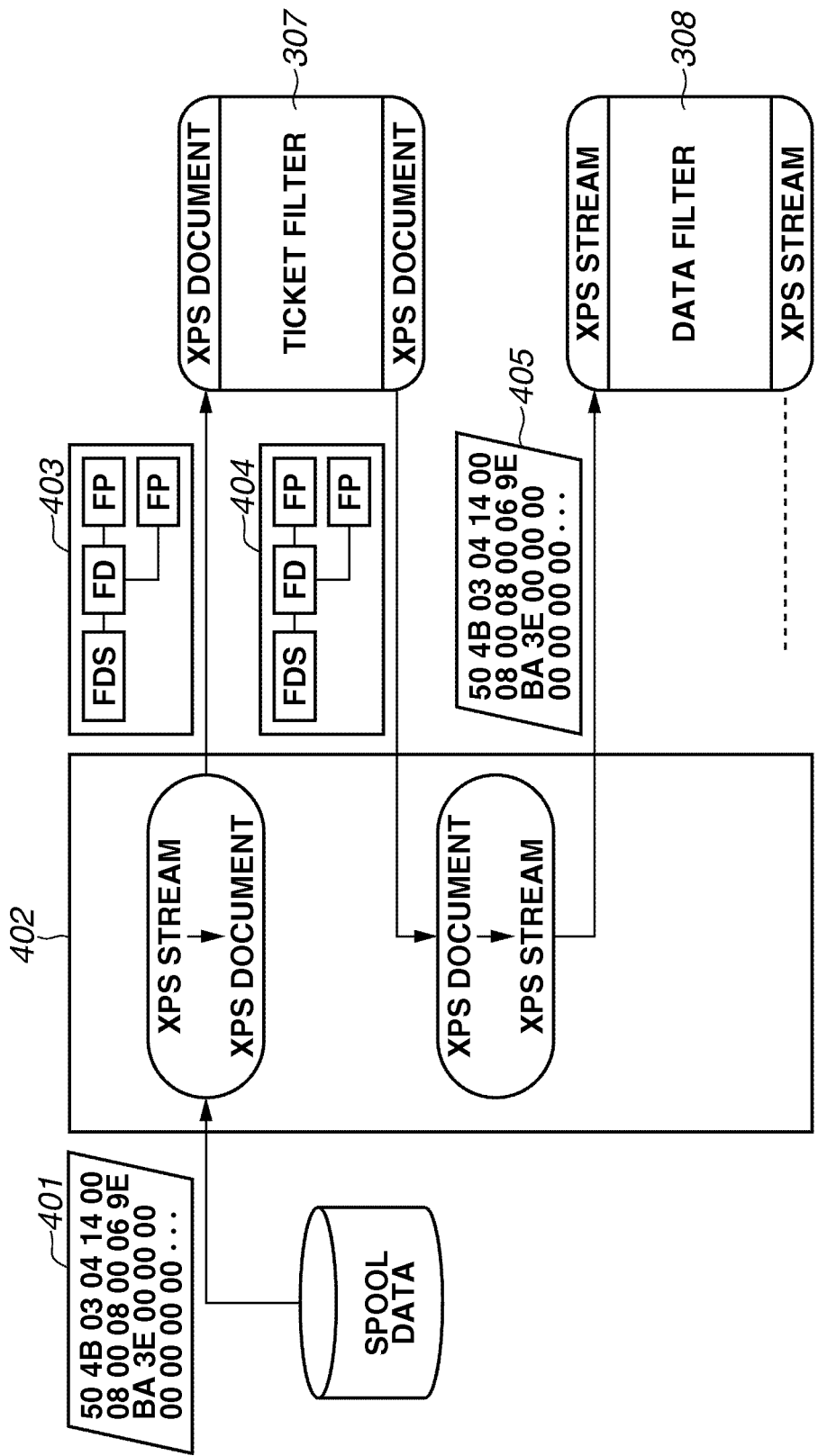
FIG. 4 is a schematic view illustrating a configuration of filters and an operation thereof according to the first exemplary embodiment.

FIG. 4 is a schematic view illustrating a configuration of filters and an operation thereof according to the first exemplary embodiment. The ticket filter 307 uses the XPS document format as an input/output interface. The data filter 308 uses the XPS stream format as the input/output interface.

The ticket filter 307 is an example of a first filter including an interface in the document format as the input/output interface. The data filter 308 is an example of a second filter including the interface in the stream format as the input/output interface.

An XPS document 401 stored as the spool data is transmitted to the ticket filter 307. Since the input interface of the ticket filter 307 is in the XPS document format, the XPS document is separated into a plurality of XPS parts 403 by a filter management function 402 of the OS, and then transmitted to the ticket filter 307. The ticket filter 307 can sequentially receive the separated XPS parts. For example, although only a part of the XPS document is stored as the spool data, the ticket filter 307 can sequentially receive the XPS part that has been completed to be stored.

The ticket filter 307 acquires the print data storage location information specified by the application with reference to the PT of the XPS part. The ticket filter 307 notifies the data filter 308 of the print data storage location information. Since the output interface of the ticket filter 307 is also in the XPS document format, the ticket filter 307 outputs the received XPS parts in XPS part unit.

The plurality of the XPS parts 404 output by the ticket filter 307 are transmitted to the data filter 308. Since the input interface of the data filter 308 is in the XPS stream format, the filter management function 402 of the OS converts the plurality of the XPS parts 404 into the XPS documents 405. The data filter 308 receives the converted XPS documents 405 as the bite stream. The data filter 308 stores the input XPS document 405 in the storage location of the print data notified by the ticket filter 307. Since the output interface of the data filter 308 is also in the XPS stream format, when the data is output, it is output as the bite stream. However, as described above, the data filter 308 according to the present exemplary embodiment does not output any data.

With this configuration, the purpose can be easily realized for storing the XPS document in the storage location of the print data specified by the PT. Other filters may be disposed before and after each filter to realize a certain function. If the filter that uses the XPS stream as the input/output interface performs all processing, which is required for uniquely rasterizing the print data to the XPS part according to the structure of the XPS document, and the processing is not technically easy. Further, with updating the version, when the configuration of the XPS document is changed, the data cannot be correctly rasterized by its own rasterizing processing.

Figure 5:
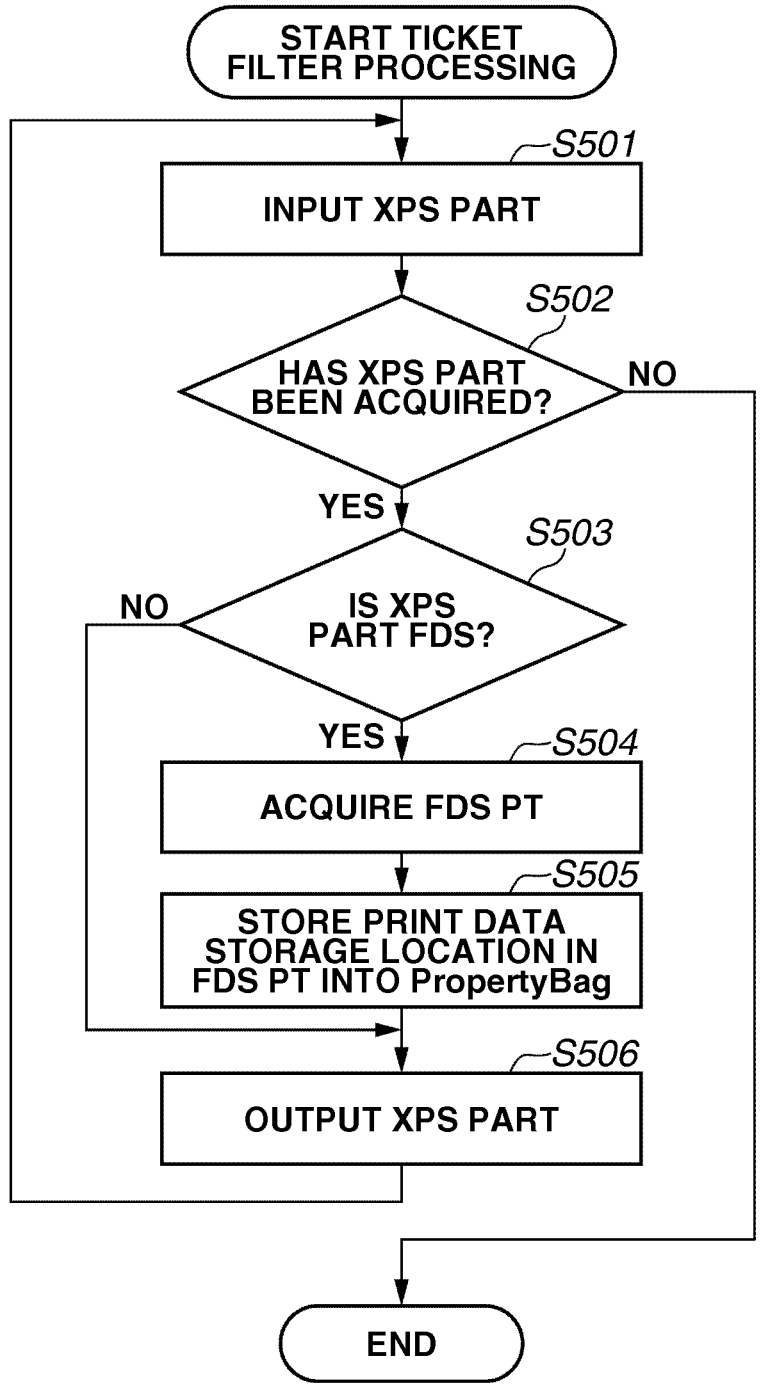
FIG. 5 is a flowchart illustrating an example of processing for acquiring print data storage location information about a ticket filter.

FIG. 5 is a flowchart illustrating an example of processing for acquiring the print data storage location information performed by the ticket filter 307.

As described above, the ticket filter 307 uses the XPS document format as the input/output interface. In step S501, the ticket filter 307 requests the XPS parts to the filter management function 402 of the OS. The filter management function 402 of the OS transmits the XPS parts, according to the request, one by one to the ticket filter 307 when the XPS parts are ready.

In step S502, the ticket filter 307 determines whether the XPS parts are acquired in step S501.

When the XPS parts are acquired (YES in step S502), then in step S503, the ticket filter 307 determines whether the XPS parts input in step S501 are the FDS.

When it is determined that the XPS parts input in step S503 are the FDS (YES in step S503), then in step S504, the ticket filter 307 further acquires the PT associated with the FDS.

In step S505, the ticket filter 307 reads the print data storage location information described as one of the print setting in the acquired PT, and then stores the information in PropertyBag. The PropertyBag is a data management function provided by the filter management function 402 of the OS. All filters can store the arbitrary data in the PropertyBag and acquires the data therefrom.

In step S506, the ticket filter 307 gives an instruction to the filter management function 402 of the OS to transmit the XPS parts input in step S501 to a subsequent filter. The print data output by the ticket filter 307 is converted into a format corresponding to the input interface of the subsequent filter by the filter management function 402 of the OS, and then transmitted to the subsequent filter. When it is determined that the XPS part input in step S503 is not in the FDS (NO in step S503), the ticket filter 307 skips the processing in steps S504 and S505, and then performs the processing in step S506. Subsequently, the ticket filter 307 returns to the processing in step S501, and repeatedly performs the processing in steps S501 to S506 on the acquired XPS parts. In step S502, when it is determined that the XPS parts cannot be acquired, the ticket filter 307 ends the processing.

Figure 6:
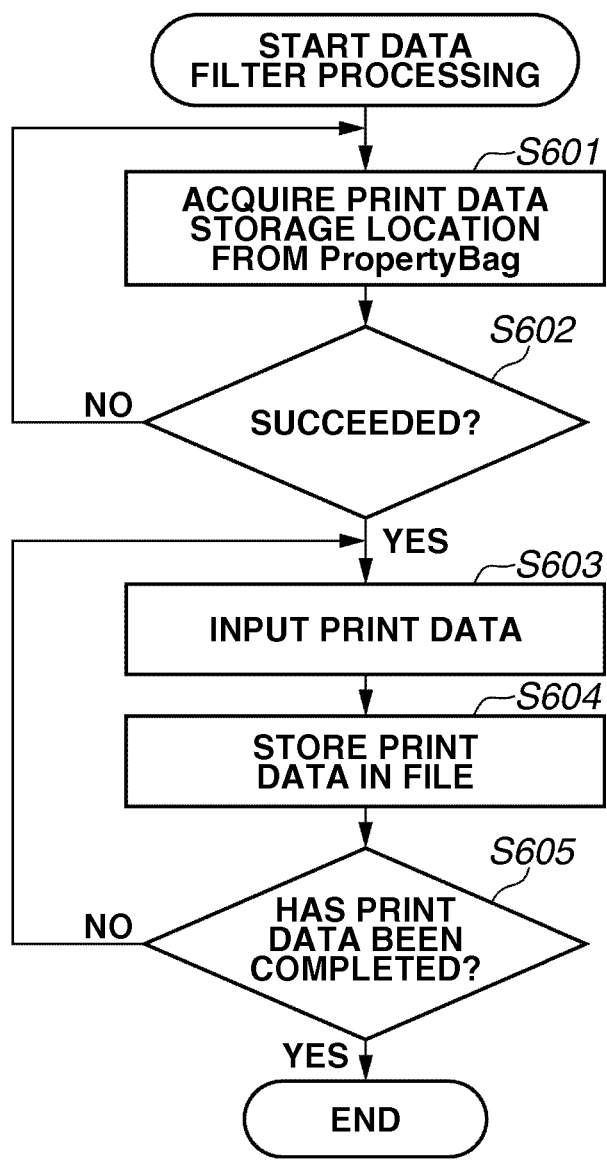
FIG. 6 is a flowchart illustrating an example of processing for storing print data performed by a data filter.

FIG. 6 is a flowchart illustrating an example of processing for storing the print data performed by the data filter 308. As described above, the data filter 308 uses the XPS stream format as the input/output interface. In step S601, the data filter 308 inquires the PropertyBag whether to include the print data storage location information. The print data storage location information is stored in the PropertyBag by the processing performed by the ticket filter 307 in step S505.

In step S602, the data filter 308 determines whether the processing in step S601 has been successfully performed. When it is determined that acquiring the print data storage location information has been failed (NO in step S602), then in step S601, the data filter 308 attempts to acquire the print data storage location information from the PropertyBag again after a predetermined interval, for example, a sleep for 100 msec. When it is determined that the print data storage location information has been successfully acquired (YES in step S602), then in step S603, the data filter 308 requests the filter management function 402 of the OS the print data in a certain size, 2 Mbyte for example. The filter management function 402 of the OS transmits to the data filter 308 the print data in the requested size as soon as it is ready, in sequential order from a leading end of the print data.

In step S604, the data filter 308 writes the acquired print data in the certain size as a file in a location of the external storage device 15 according to the print data storage location information acquired in step S601. The external storage device 15 is an example of a recording region.

In step S605, the data filter 308 determines whether all print data has been input. When the print data requested by the data filter 308 in step S603 is input up to an end of the data, the filter management function 402 of the OS returns information indicating that the input of the data reaches the end of the data. With reference to the information, the data filter 308 determines whether the all print data is input. In step S605, when it is determined that the all print data has not been input (No in step S605), then in steps S603 and S604, the data filter 308 performs processing for inputting continuing print data of the print data that has been input and writing it into the file. When it is determined that the all print data has been input (YES in step S605), the data filter 308 ends the processing.

According to the flowchart illustrated in FIG. 6, the data filter 308 is directed to storing the entire print data. When only a part of the print data is to be stored, the data filter 308 determines whether a desired part of the print data has been already input before the determination is performed in step S605, and when it has been already input, the processing ends. When the virtual driver 203 is to be stored only the part of the print data, with such a configuration, the virtual driver 203 can perform the processing at an even higher speed.

The virtual driver 203 according to the present exemplary embodiment has a simple and solid configuration using the function of the OS to store the print data in the storage location of the print data described in the print setting information in the print data. The configuration of the present exemplary embodiment can be applied to other examples for processing the print data according to the print setting information in the print data.

Figure 7:
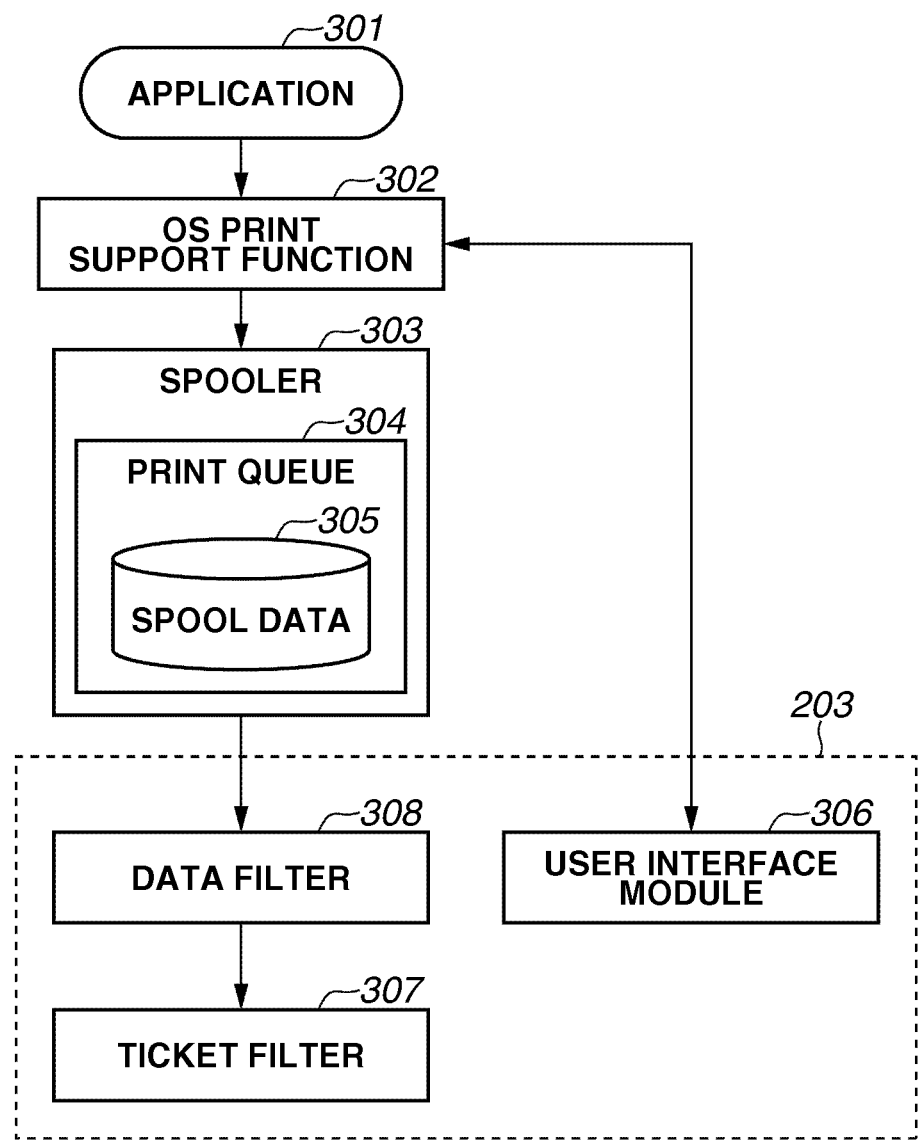
FIG. 7 is an example of a schematic view illustrating an entire configuration of a virtual driver in a print program according to a second exemplary embodiment.

A second exemplary embodiment will be described. FIG. 7 is an example of a schematic view illustrating an entire configuration of the virtual driver 203 in the print program according to the second exemplary embodiment. As illustrated in FIG. 7, the virtual driver 203 according to the present exemplary embodiment performs the processing in an order of the data filter 308 and the ticket filter 307, which is an opposite order of the processing performed by the virtual driver 203 according to the first exemplary embodiment. The processing of the filters will be described in detail below. Except for the order of processing performed by the filters and the content thereof, the configuration of the virtual driver 203 illustrated in FIG. 7 is similar to that illustrated in FIG. 3 according to the first exemplary embodiment. An entire configuration of the print system according to the present exemplary embodiment is similar to that illustrated in FIG. 1 according to the first exemplary embodiment. Hereafter, not otherwise specified, the configuration according to the present exemplary embodiment is similar to that according to the first exemplary embodiment.

According to the example illustrated in FIG. 7, the ticket filter 307 is arranged after the data filter 308. As illustrated in FIG. 4 according to the first exemplary embodiment, when the output interface of a previous filter is different from the input interface of a subsequent filter between continuous filters, conversion processing is performed by the filter management function 402 of the OS. The conversion processing requires a certain processing time depending on how complex the XPS document is. Accordingly, when speedy processing by the XPS driver is expected, it is desirable to configure the filter not to perform the conversion processing as much as possible.

Figure 8:
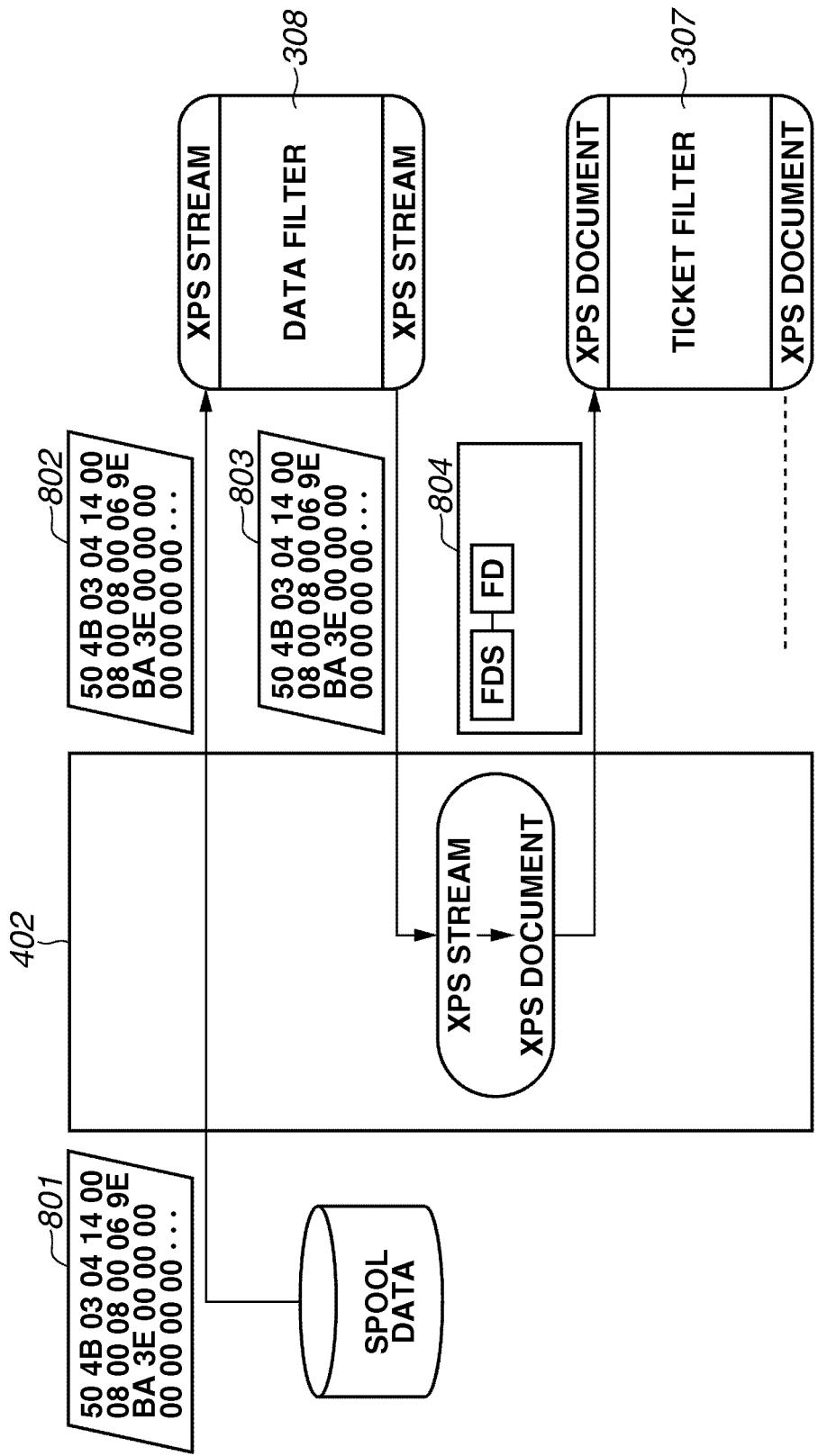
FIG. 8 is a schematic view illustrating a configuration of filters and an operation thereof according to the second exemplary embodiment.

FIG. 8 is a schematic view illustrating the configuration of the filters and the operation thereof according to the second exemplary embodiment. As described above, the virtual driver 203 according to the present exemplary embodiment includes the two filters of the data filter 308 and the ticket filter 307. The data filter 308 uses the XPS stream format as the input/output interface. Therefore, a spooled XPS document 801 is transmitted to the data filter 308 as the byte stream without being converted by the filter management function 402 of the OS. The data filter 308 outputs an input XPS document 802 as the byte stream in addition to storing it in the external storage device 15 and the RAM 14.

The ticket filter 307 uses the XPS document format as the input/output interface. Thus, an XPS document 803 output by the data filter 308 is separated into the plurality of XPS parts 804 by the filter management function 402 of the OS, and then transmitted to the ticket filter 307. The ticket filter 307 acquires the print data storage location information specified by the application with reference to the PT in the XPS parts. After notifying the data filter 308 of the print data storage location information, the ticket filter 307 ends the processing without receiving the subsequent XPS parts. The data filter 308 moves or duplicates the stored XPS document to the storage location of the print data notified by the ticket filter 307.

The data filter 308 is an example of a first filter including an interface in the stream format as the input/output interface. The ticket filter 307 is an example of a second filter including the interface in the document format as the input/output interface.

With the configuration described above, a purpose for storing the XPS document in the storage location of the print data specified by the PT can be easily realized. Further, a number of times of converting the XPS document by the filter management function 402 of the OS is decreased to once to speed up the processing. The order of processing performed by the data filter 308 and the ticket filter 307 is crucial for speeding up processing. To realize some function, other filters may be arranged before and after each filter.

Figure 9:
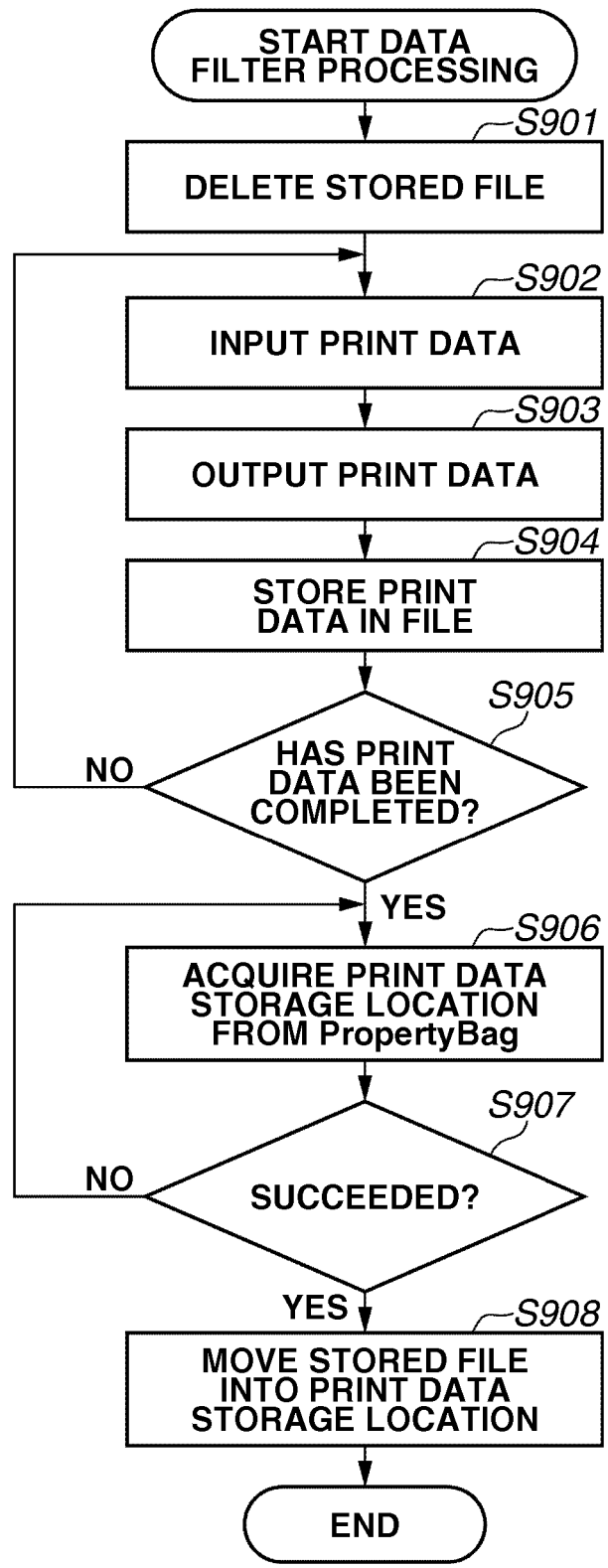
FIG. 9 is a flowchart illustrating an example of processing for storing print data performed by a data filter.

FIG. 9 is a flowchart illustrating an example of the processing for storing the print data performed by the data filter 308. In step S901, when the stored print data described below remains in the data filter 308, data filter 308 deletes the data. The processing deletes the file that remains after the processing performed by the data filter 308 has ended with error and is not necessary for the subsequent processing.

As described above, the data filter 308 uses the XPS stream format as the input/output interface. In step S902, the data filter 308 requests the filter management function 402 of the OS the print data in a certain size, 2 Mbyte for example. In step S903, the data filter 308 gives an instruction to the filter management function 402 of the OS to transmit the input print data in the certain size to subsequent filter. In step S904, the data filter 308 writes the acquired print data in the certain size to the external storage device 15 as the file. As an example, the data filter 308 generates a file having a random name under a specified folder managed by the virtual driver 203. The print data may be stored on the RAM 14 not in the external storage device 15.

In step S905, the data filter 308 determines whether the all print data has been input. When it is determined that the all print data has not been input (NO in step S905), then in steps S902 to S904, the data filter 308 inputs/outputs the continuing print data of the print data that has been input and performs processing for writing the data into the file.

When it is determined that the all print data has been input (YES in step S905), then in step S906, the data filter 308 inquires the PropertyBag whether to include the print data storage location information. The print data storage location information is stored in the PropertyBag by the processing performed by the ticket filter 307 described below.

In step S907, the data filter 308 determines whether the processing has been successfully performed in step S906. When it is determined that acquiring the print data storage location information has been failed (NO in step S907), then in step S906, the data filter 308 attempts to acquire the print data storage location information from the PropertyBag again after the predetermined interval, for example, a sleep for 100 msec.

When it is determined that the print data storage location information has been successfully acquired (YES in step S907), then in step S908, the data filter 308 moves the print data stored in step S904 to the acquired storage location of the print data. The ticket filter 307 may perform the movement processing. In this case, the data filter 308 stores the information indicating the location of the print data stored in step S904 into the PropertyBag. The ticket filter 307 moves the print data stored in the location acquired from the PropertyBag into the storage location of the print data in the PT. Further, the filter special for the movement processing may perform the movement processing.

According to the flowchart illustrated in FIG. 9, the data filter 308 is directed to storing the entire print data. When the data filter 308 is directed to storing only the part of the print data, the data filter 308 performs the processing in steps S906 and S907 before the determination is performed in step S905. Subsequently, if the desired part of the print data has been already input, the data filter 308 stops the input/output processing (steps S902 to S904) of the print data, performs the processing in step S908, and then ends the processing. When the virtual driver 203 is directed to storing only the part of the print data, with such a configuration described above, the processing can be performed by the virtual driver 203 at an even higher speed.

Figure 10:
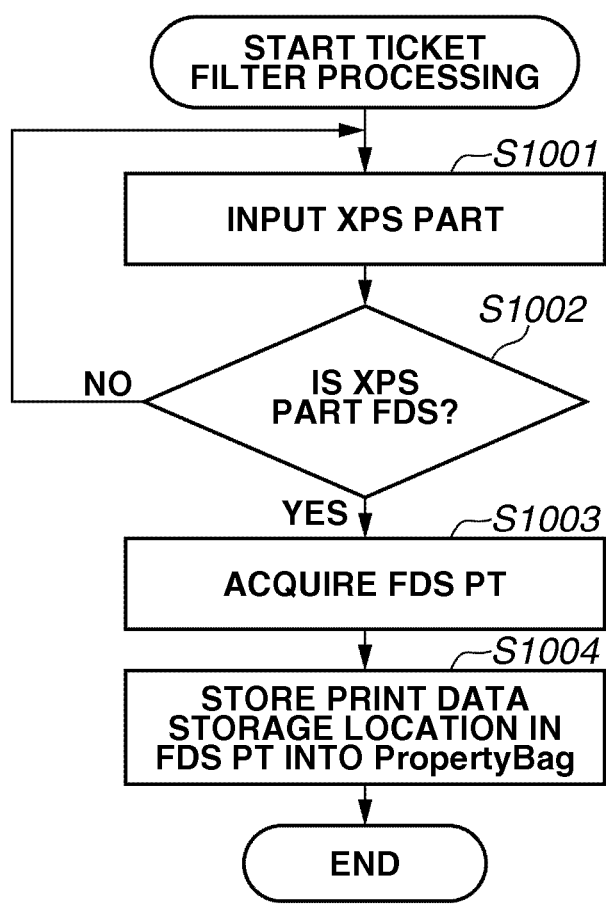
FIG. 10 is a flowchart illustrating an example of processing for acquiring print data storage location information performed by a ticket filter.

FIG. 10 is a flowchart illustrating an example of the processing for acquiring the print data storage location information performed by the ticket filter 307. As described above, the ticket filter 307 uses the XPS document format as the input/output interface. In step S1001, the ticket filter 307 requests the XPS parts to the filter management function 402 of the OS.

In step S1002, the ticket filter 307 determines whether the XPS parts input in step S1001 are the FDS. When it is determined that the XPS parts input in step S1002 are not in the FDS (NO in step S1002), then in steps S1001 and S1002, the ticket filter 307 repeatedly requests for the XPS parts until the FDS is input. The FDS is classified in an upper class of the FP and the FD in a logical structure of the XPS document. Since the filter management function 402 of the OS transmits the parts in sequential order from the upper class part in the logical structure of the XPS document, the ticket filter 307 can input the FDS right after requesting the input of the XPS parts.

When it is determined that the input XPS parts are the FDS (YES in step S1002), then in step S1003, the ticket filter 307 further acquires the PT associated with the FDS. In step S1004, the ticket filter 307 reads the print data storage location information described in the acquired PT as one of the print settings and stores it in the PropertyBag. As described above, the ticket filter 307 does not request to input all or a part of the XPS parts after the XPS parts in the FDS, and then ends the processing.

Even while the filter management function 402 of the OS is converting the XPS document, when all filters completes the processing, a print job is ended. When the ticket filter 307 does not request all or a part of an unnecessary part, the processing in step S908 for storing the print data by the data filter 308 is completed. Subsequently, the print job in the print queue 304 is also ended immediately. With this processing, when a plurality of print jobs are continuously input, productivity of the virtual driver 203 can be improved.

In the print system according to the present exemplary embodiment, via various kinds of operations including printing and preview requested by the user for the add-on 202, request for the virtual driver 203 to store the print data is occur. With the configuration of the virtual driver 203, the print data can be stored at a high speed. As an entire print system, an operational feeling of good responses can be provided for the users. The configuration of the present exemplary embodiment can be applied to other purposes for processing the print data according to the print setting information in the print data.

Figure 11:
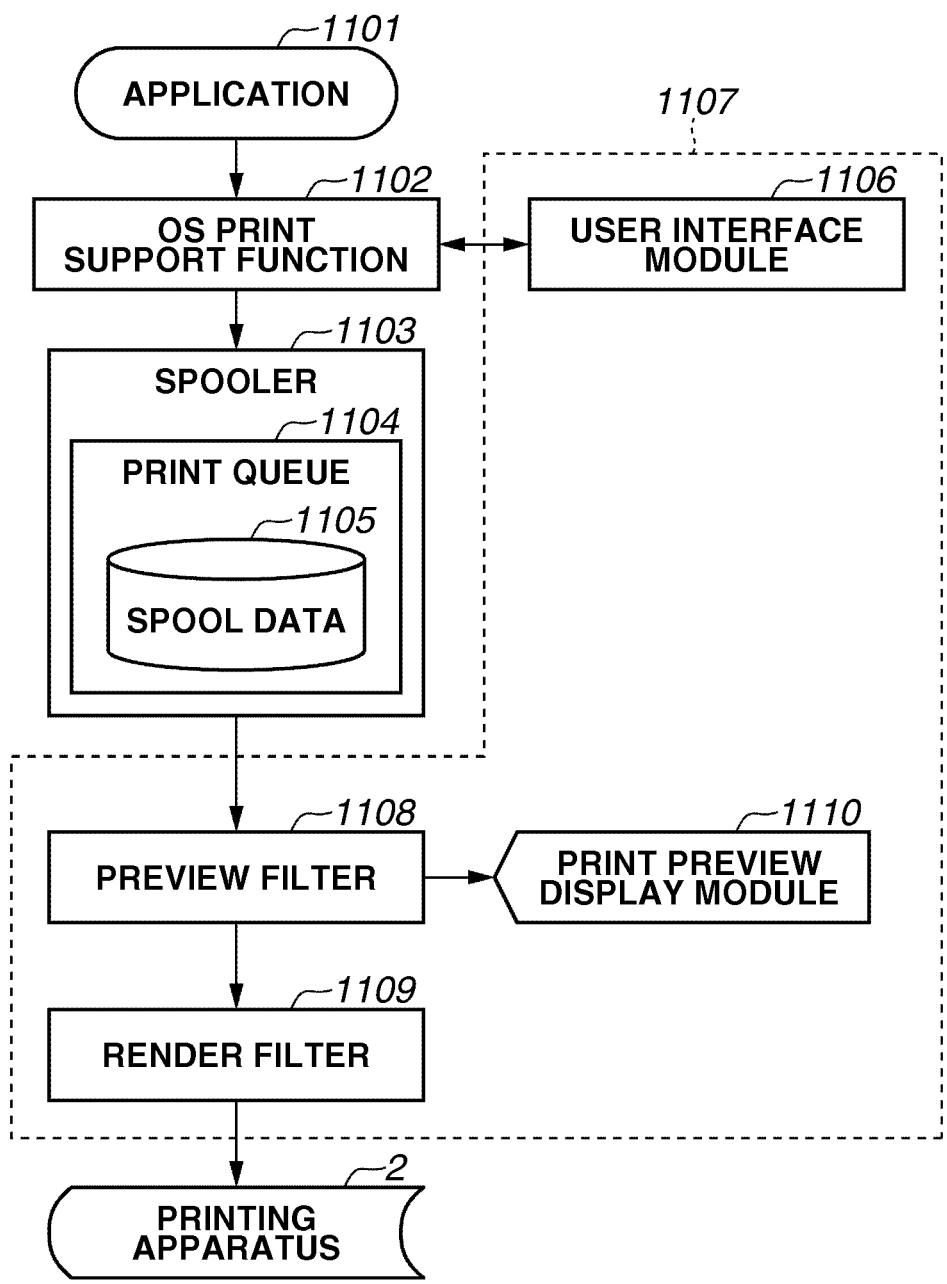
FIG. 11 is an example of a schematic view illustrating an entire configuration focusing on a printer driver in a print program performed by an information processing apparatus according to a third exemplary embodiment.

A third exemplary embodiment will be described. FIG. 11 is an example of a schematic view illustrating an overall configuration focusing on a printer driver 1107 in the print program performed by the PC 1 according to the third exemplary embodiment. The entire configuration of the print system according to the present exemplary embodiment is similar to FIG. 1 according to the first exemplary embodiment. Hereafter, not otherwise specified, the configuration according to the present exemplary embodiment is similar to that according to the first exemplary embodiment.

The printer driver 1107 is a standard printer driver that receives a print request from an application 1101 and transmits a print command to the printing apparatus 2. Thus, the present invention is not limited to the configuration of the print program according to the first exemplary embodiment illustrated in FIG. 2, but the print request is received from any application.

Components from the application 1101 to a user interface module 1106 according to the present exemplary embodiment are respectively similar to 301 to 306 illustrated in FIG. 3. The printer driver 1107 includes two filters of a preview filter 1108 and a rendering filter 1109. The preview filter 1108 uses the XPS stream format as the input/output interface. The preview filter 1108 activates the print preview display module 1110 by another process according to specified settings in the print setting information. The print preview display module 1110 displays on the display unit 17 a print preview indicating an estimated print result based on the print data received from the preview filter 1108. Upon reception of a print instruction from the user, the print preview display module 1110 turns off a display instruction of the print preview of the print setting information in the print data, and then adds again the print data into a print queue 1104 as spool data 1105.

A rendering filter 1109 uses the XPS document format as the input/output interface. The rendering filter 1109 generates, based on the print data, the print command that can be interpreted by the printing apparatus 2, and then transmits it to the printing apparatus 2. The printing apparatus 2 performs the print processing based on the received print command. The printer driver 1107 may further include a filter for performing layout processing on the print data.

The rendering filter 1109 illustrated in FIG. 11 is arranged after the preview filter 1108. The preview filter 1108 is an example of a first filter including an interface in the stream format as the input/output interface. The rendering filter 1109 is an example of the second filter including the interface in the document format as the input/output interface.

Figure 12:
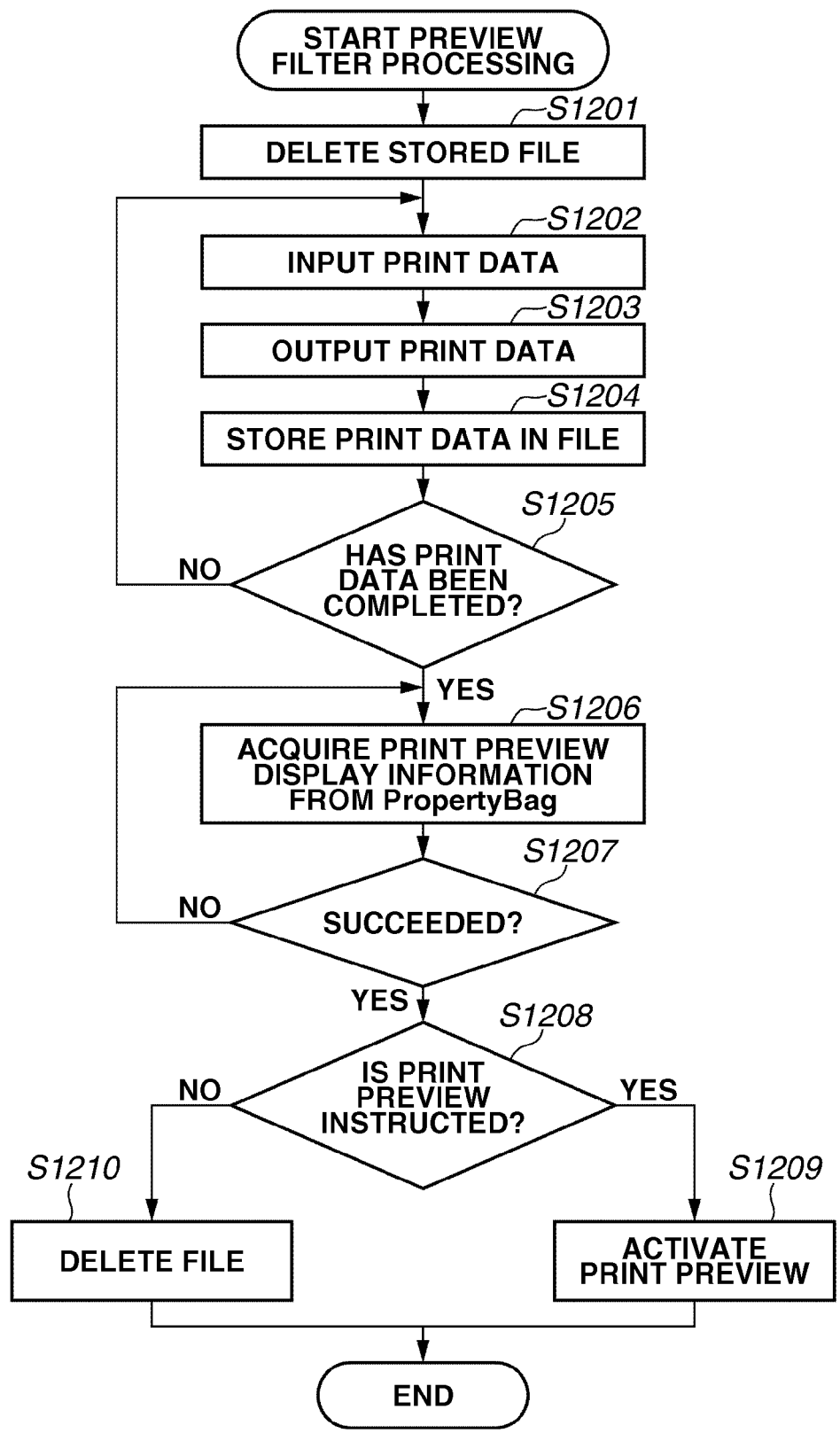
FIG. 12 is a flowchart illustrating an example of processing for activating a print preview display module performed by a preview filter.

FIG. 12 is a flowchart illustrating an example of processing for activating a print preview display module performed by a preview filter 1108. Processing in steps S1201 to S1207 is similar to that in steps S901 to S907 respectively performed by the data filter 308 according to the first exemplary embodiment. In step S1206, the preview filter acquires display information about print preview (print preview display information) not the print data storage location information from the PropertyBag.

In step S1208, with reference to the print preview display information, the preview filter 1108 determines whether the display of the print preview is instructed. When it is determined that displaying the print preview is instructed (YES in step S1208), then in step S1209, the preview filter 1108 activates the print preview display module 1110. At this point, the preview filter 1108 transmits the print data stored in step S1204 to the print preview display module 1110.

When it is determined that displaying the print preview is not instructed (NO in step S1208), then in step S1210, the preview filter 1108 deletes the file generated in step S1204. A rendering filter 1109 or a special filter may perform the processing described above.

Figure 13:
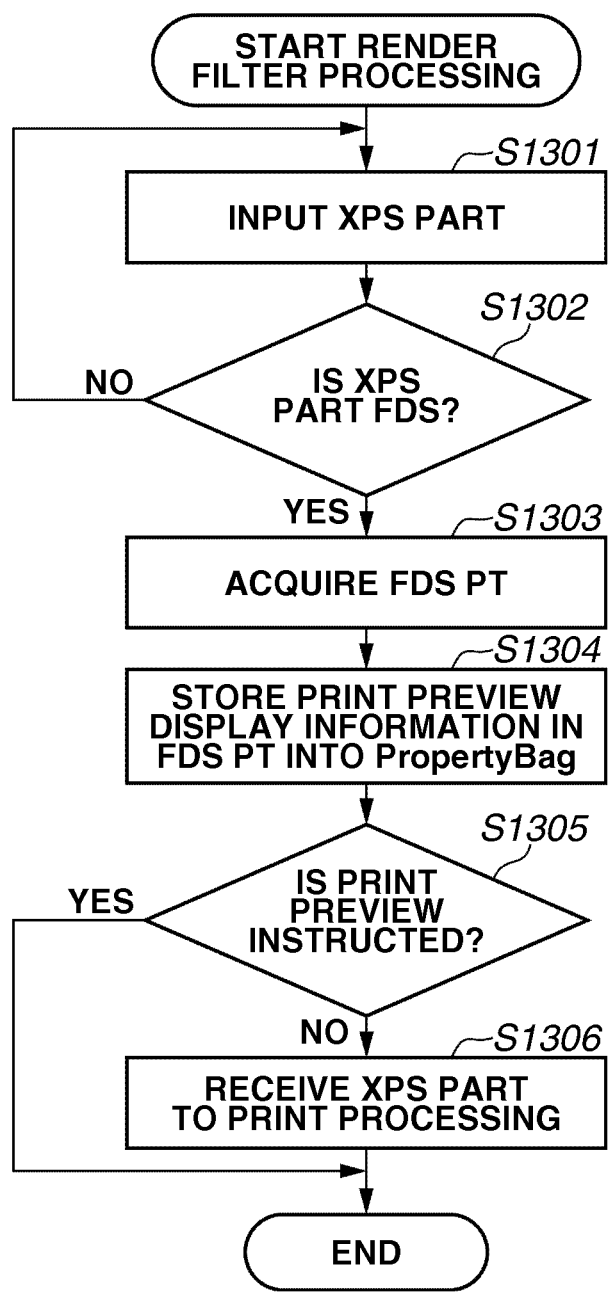
FIG. 13 is a flowchart illustrating an example of processing performed by a rendering filter.

FIG. 13 is a flowchart illustrating an example of the processing performed by the rendering filter 1109. The processing in steps S1301 to S1304 is similar to the processing in steps S1001 to S1004 respectively performed by the ticket filter 307 according to the first exemplary embodiment. In step S1304, the rendering filter 1109 stores in the PropertyBag the print preview display information not the print data storage location information. In step S1305, with reference to the print preview display information, the rendering filter 1109 determines whether displaying the print preview is instructed.

When it is determined that displaying the print preview is instructed (YES in step S1305), then the rendering filter 1109 ends the processing. When it is determined that displaying the print preview is not instructed (NO in step S1305), then in step S1306, the rendering filter 1109 generates a print command based on the print data and transmits the print command to the printing apparatus 2.

With the configuration of the filters similar to those of the virtual driver 203 according to the second exemplary embodiment, the printer driver 1107 can display the print preview at a high speed. Further, even when displaying the print preview is not instructed, by the filter management function 402 of the OS, the processing for converting the XPS document unnecessary for the print processing is not performed. With such an operation, the printer driver 1107 can perform the print processing at the similar speed to when the printer driver 1107 includes a minimum necessary configuration. The configuration of the present exemplary embodiment can be applied to other purposes for processing the print data according to the print setting information in the print data.

A fourth exemplary embodiment will be described. The printer driver 1107 according to the third exemplary embodiment may further include a function of the virtual driver 203 according to the second exemplary embodiment. In this case, the printer driver 1107 further determines whether the print data storage location information is specified for the print setting information. When it is specified, the printer driver 1107 is operated as the virtual driver, and ended without performing the print processing. With this processing, one printer driver and an additional application can configure the print program illustrated in FIG. 2. With this configuration, the virtual driver can be hidden from the user as if it did not exist.

According to the above-described exemplary embodiments, the simple and solid configuration can process the print data according to the print setting information therein.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., non-transitory computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-185044 filed Aug. 26, 2011, which is hereby incorporated by reference herein in its entirety.

What is claimed is:

1. A print data processing method comprising:
    receiving print data in a stream format by a first filter including an interface in a stream format as an input/output interface;
    analyzing parts constituting the print data, which is output from the first filter, by a second filter including an interface in a document format as an input/output interface; and notifying of print setting information obtained by the analysis performed by the second filter, wherein the first filter determines whether the notified print setting information is obtained, wherein the first filter performs processing identified by the notified print setting information if it is determined that the notified print setting information is obtained, and wherein the second filter does not request remaining parts of the parts constituting the print data in a case where the print setting information is obtained.

2. The print data processing method according to claim 1, wherein the print data is stored in a storage location identified by the print setting information.

3. The print data processing method according to claim 1, wherein a display module is activated if the print setting information indicates preview processing.

4. The print data processing method according to claim 1, wherein the print setting information obtained in the analyzing is stored in a property bag, the property bag being provided by an operating system, and wherein the first filter reads the print setting information from the property bag and stores the print data in a storage location identified by the print setting information.

5. The print data processing method according to claim 1, further comprising:

determining whether an analysis target of the print data is a fixed document sequence (FDS); and obtaining print setting information of the FDS in a case where it is determined that the analysis target of the print data is the FDS, wherein the print setting information of the FDS is notified, and wherein at least one of remaining parts of the print data is subsequent FDS parts.

6. The print data processing method according to claim 1, wherein print data which is generated by a first printer driver including the first filter and the second filter is displayed, wherein the displayed print data is edited, and wherein a print command is generated based on the edited print data.

7. The print data processing method according to claim 1, wherein the print data in the stream format is received by the first filter in a case where a print instruction is issued by using plug-in software called from an application.

8. A print data processing apparatus comprising:

a first filter including an interface in a stream format as an input/output interface and receiving print data in a stream format; and a second filter including an interface in a document format as an input/output interface and analyzing parts constituting the print data, which is output from the first filter, transmitted through the first filter, wherein the second filter notifies of print setting information obtained by the analysis performed by the second filter, wherein the first filter determines whether the notified print setting information is obtained, wherein the first filter performs processing identified by the notified print setting information if it is determined that the notified print setting information is obtained, and wherein the second filter does not request remaining parts of the parts constituting the print data in a case where the print setting information is obtained.

9. A non-transitory computer-readable storage medium storing a program which when executed by a computer, causes the computer to perform a print data processing method comprising:

receiving print data in a stream format by a first filter including an interface in a stream format as an input/output interface;

analyzing parts constituting the print data, which is output from the first filter, by a second filter including an interface in a document format as an input/output interface; and notifying of print setting information obtained by the analysis performed by the second filter, wherein the first filter determines whether the notified print setting information is obtained, wherein the first filter performs processing identified by the notified print setting information if it is determined that the notified print setting information is obtained, and wherein the second filter does not request remaining parts of the parts constituting the print data in a case where the print setting information is obtained.

10. The non-transitory computer-readable storage medium according to claim 9, wherein the print data is stored in a storage location identified by the print setting information.

11. The non-transitory computer-readable storage medium according to claim 9, wherein a display module is activated if the print setting information indicates preview processing.

12. The non-transitory computer-readable storage medium according to claim 9, wherein the print setting information obtained in the analyzing is stored in a property bag, the property bag being provided by an operating system, and wherein the first filter reads the print setting information from the property bag and stores the print data in a storage location identified by the print setting information.

13. The non-transitory computer-readable storage medium according to claim 9, the print data processing method further comprising:

determining whether an analysis target of the print data is a fixed document sequence (FDS); and obtaining print setting information of the FDS in a case where it is determined that the analysis target of the print data is the FDS, wherein the print setting information of the FDS is notified, and wherein at least one of remaining parts of the print data is subsequent FDS parts.

14. The non-transitory computer-readable storage medium according to claim 9, wherein print data which is generated by a first printer driver including the first filter and the second filter is displayed, wherein the displayed print data is edited, and wherein a print command is generated based on the edited print data.

15. A print data processing method comprising:

receiving print data in a stream format by a first filter including an interface in a stream format as an input/output interface;

analyzing parts constituting the print data, which is output from the first filter, by a second filter including an interface in a document format as an input/output interface;

displaying the print data output by a first printer driver including the first and second filters;

editing the displayed print data; and generating a print command based on the edited print data, wherein a storage location of the print data acquired in the analyzing by the second filter is stored in a storage unit, wherein the first filter stores in the storage location the print data output by the first printer driver, and wherein the displaying of the print data and the editing of the print data are performed by a plug-in software.

16. The print data processing method according to claim 15, wherein the storage location is stored in a property bag provided by an operating system.

* * * * *